(12) United States Patent
Zhu et al.

(10) Patent No.: US 11,631,868 B2
(45) Date of Patent: Apr. 18, 2023

(54) HEAT PIPE SEPARATOR FOR FUEL CELL ASSEMBLY THERMAL MANAGEMENT

(71) Applicant: Toyota Motor Engineering and Manufacturing North America, Inc., Plano, TX (US)

(72) Inventors: Gaohua Zhu, Ann Arbor, MI (US); Tom Shieh, Ann Arbor, MI (US); Swetha Minupuri, Ann Arbor, MI (US); Evan Fleming, Ann Arbor, MI (US); Debasish Banerjee, Ann Arbor, MI (US)

(73) Assignee: Toyota Motor Engineering and Manufacturing North America, Inc., Plano, TX (US)

( * ) Notice: Subject to any disclaimer, the term of this patent is extended or adjusted under 35 U.S.C. 154(b) by 461 days.

(21) Appl. No.: 16/839,732

(22) Filed: Apr. 3, 2020

(65) Prior Publication Data

US 2021/0313598 A1    Oct. 7, 2021

(51) Int. Cl.
*H01M 8/04007* (2016.01)
*H01M 8/0267* (2016.01)
*H01M 8/1004* (2016.01)
*H01M 8/2483* (2016.01)
*H01M 8/04089* (2016.01)

(52) U.S. Cl.
CPC ..... *H01M 8/04074* (2013.01); *H01M 8/0267* (2013.01); *H01M 8/04089* (2013.01); *H01M 8/1004* (2013.01); *H01M 8/2483* (2016.02)

(58) Field of Classification Search
CPC ........... H01M 8/04067; H01M 8/1004; H01M 8/2483; H01M 8/0267; H01M 8/04074
See application file for complete search history.

(56) References Cited

U.S. PATENT DOCUMENTS

| | | | |
|---|---|---|---|
| 6,677,072 B2 | 1/2004 | Suenaga et al. | |
| 9,666,884 B2 * | 5/2017 | Lee | H01M 8/0258 |
| 2002/0142201 A1 * | 10/2002 | Nelson | H01M 8/04014 |
| | | | 429/439 |
| 2016/0315333 A1 | 10/2016 | Blanchet et al. | |

* cited by examiner

*Primary Examiner* — Brittany L Raymond
(74) *Attorney, Agent, or Firm* — Jordan IP Law, LLC

(57) ABSTRACT

A fuel cell assembly, a heat pipe for such a fuel cell assembly, and a fuel cell stack. The fuel cell assembly includes a fuel cell having an MEA structure, and a pair of heat pipe separator plates in physical and thermal contact with a planar surface of the fuel cell. Each heat pipe separator plate includes an external heat transfer fin to dissipate a portion of the heat generated by the fuel cell through exposed outer peripheral edges thereof. Each heat pipe separator plate also includes voids formed in an interior planar surface thereof, to be aligned with voids of other heat pipe separator plates when the fuel cell assembly is arranged in a stack. Upper voids are to define upper interior channels in fluid communication with a portion of the air stream supplied to the cathode. A heat transfer insert is arranged in the upper voids, and includes internal heat transfer fins to dissipate another portion of the heat into the upper interior channels for contact with the air stream.

20 Claims, 8 Drawing Sheets

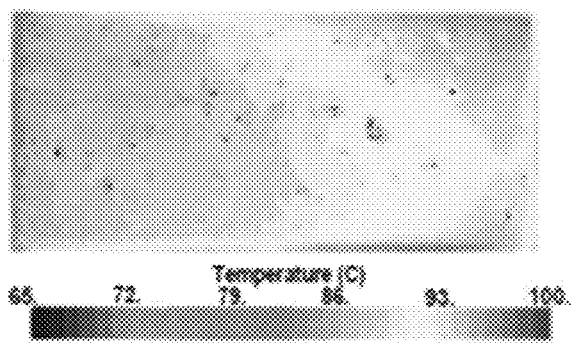 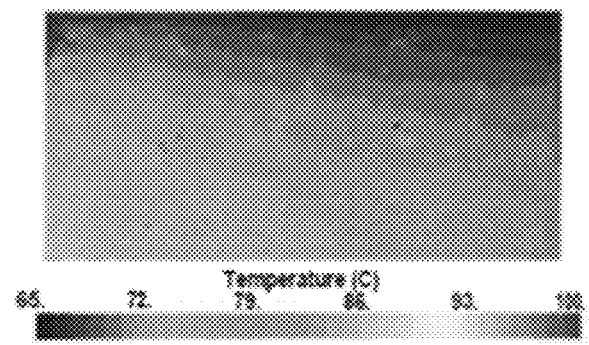
FIG. 7A  FIG. 7B

HEAT PIPE SEPARATOR FOR FUEL CELL ASSEMBLY THERMAL MANAGEMENT

TECHNICAL FIELD

Embodiments relate generally to a fuel cell assembly, a highly thermally conductive heat pipe for such a fuel cell assembly, and a fuel cell stack.

BACKGROUND

Heat pipes that extend to an area where heat may be conductively transferred from a hot zone to air or liquid cool through the high efficient two phase cooling process inside the heat pipes.

Contemporary fuel cell design generally comprise a plurality of fuel cells arranged in a stack formation, each fuel cell in the stack having a structure in the form of a membrane electrode assembly (MEA) that may comprise an electrolyte membrane (e.g., a polymer electrolyte membrane) interposed between a first electrode (e.g., an anode) and a second electrode (e.g., a cathode). In operation, a first fuel reactant, for example, hydrogen ($H_2$), is supplied to the anode, while a second fuel reactant, for example, oxygen ($O_2$) is supplied via a stream of compressed air, is supplied to the cathode. The resultant exothermic reaction produces heat. The overall performance of the fuel cell is sensitive to the temperature of the MEA. The energy/power transfer of contemporary fuel cells are impacted during operation through heat loss and over-heating of the MEA.

Conventional methods to cool the stack include use of a fluid coolant. In operation, the temperature ($T_i$) of a coolant fluid at the inlet is lower than the temperature of the coolant fluid at the outlet ($T_o$), thereby resulting in a large temperature gradient ($\Delta T$) across the region area that requires cooling, namely, the MEA.

Conventional cooling methods are also expensive, bulky, and often require additional cooling components that further increases overall costs and overall size.

BRIEF SUMMARY

There is a continuing need to manufacture a fuel cell stack having a reduced overall size and longer operational life when compared to conventional designs, that operates at a higher efficiency when compared to conventional designs, and which effectively cools the fuel cell stack while preventing over-heating of the stack during operation.

In accordance with embodiments, a fuel cell assembly may comprise one or more of: a fuel cell, having a membrane electrode assembly (MEA) structure in which a cathode side thereof is to receive a stream of air to supply $O_2$ as a fuel reactant; and a first heat pipe including a first heat pipe separator plate in physical and thermal contact with a planar surface of the fuel cell, and a second heat pipe including a second heat pipe separator plate in physical and thermal contact with an opposite planar surface of the fuel cell, the first heat pipe separator plate and the second heat pipe separator plate including, respectively: an external heat transfer fin to dissipate a portion of the heat generated by the fuel cell through the exposed outer peripheral edges thereof, one or more upper voids, formed in an interior planar surface thereof, to be aligned with upper voids of the other heat pipe separator plate when the fuel cell assembly is arranged in a stack, and thereby define one or more upper interior channels in fluid communication with a portion of the air stream, and a heat transfer insert, arranged in the upper voids, to include one or more internal heat transfer fins to dissipate another portion of the heat generated by the fuel cell into the upper interior channels for contact with the air stream.

In accordance with embodiments, a heat pipe for a fuel cell assembly that includes a fuel cell having a membrane electrode assembly (MEA) structure in which a cathode side thereof is to receive a stream of air to supply $O_2$ as a fuel reactant, in which the heat pipe may comprise one or more of: a heat pipe separator plate in physical and thermal contact with a planar surface of a corresponding fuel cell in the fuel cell assembly, the heat pipe separator plate including: an external heat transfer fin to dissipate a portion of the heat generated by the fuel cell through exposed outer peripheral edges thereof, one or more upper voids, formed in an interior planar surface thereof, to be aligned with upper voids of an adjacent heat pipe separator plate when the fuel cell assembly is arranged in a stack, and thereby define one or more upper interior channels in fluid communication with a portion of the air stream, and a heat transfer insert, arranged in the upper voids, to include one or more internal heat transfer fins to dissipate another portion of the heat generated by the fuel cell into the upper interior channels for contact with the air stream.

In accordance with embodiments, a fuel cell stack may comprise one or more of: a plurality of fuel cell assemblies, one or more of the fuel cell assemblies including a fuel cell a fuel cell having a membrane electrode assembly (MEA) structure in which a cathode side thereof is to receive a stream of air to supply $O_2$ as a fuel reactant, a first heat pipe including a first heat pipe separator plate in physical and thermal contact with a planar surface of the fuel cell, and a second heat pipe including a second heat pipe separator plate in physical and thermal contact with an opposite planar surface of the fuel cell, the first heat pipe separator plate and the second heat pipe separator plate including, respectively: an external heat transfer fin to dissipate a portion of the heat generated by the fuel cell through the exposed outer peripheral edges thereof, one or more upper voids, formed in an interior planar surface thereof, to be aligned with upper voids of the other heat pipe separator plate when the fuel cell assembly is arranged in a stack, and thereby define one or more upper interior channels in fluid communication with a portion of the air stream, and a heat transfer insert, arranged in the upper voids, to include one or more internal heat transfer fins to dissipate another portion of the heat generated by the fuel cell into the upper interior channels for contact with the air stream.

In accordance with embodiments, the upper voids are distributed along the width of the first heat pipe separator plate and the second heat pipe separator plate, respectively.

In accordance with embodiments, the first heat pipe separator plate and the second heat pipe separator plate further include, respectively, one or more lower voids, formed in the interior planar surface thereof, to be aligned with lower voids of the other heat pipe separator plate when the fuel cell assembly is arranged in the stack, and thereby define one or more lower interior channels through which a portion of the air supplied to a cathode side of the fuel cell to supply $O_2$ as a fuel reactant, is to flow into the fuel cell assembly in order to facilitate cooling of the stack.

In accordance with embodiments, compressed air, a stream of which is to be supplied to the cathode-side of the MEA as a fuel reactant, is to be also used to flow through the upper interior channels and the lower interior channels in order to bring about cooling of the fuel cell assembly. In particular, a portion of the air stream which is to flow through the upper interior channels, is used to dissipate the heat generated by the fuel cell as it comes into contact with the into the upper interior channels for contact with the internal heat transfer fins.

In accordance with embodiments, the upper voids are distributed along the width of the first heat pipe separator plate and the second heat pipe separator plate, respectively.

In accordance with embodiments, the upper voids and the lower voids are spaced apart from each other in a vertical direction relative to the planar surface.

In accordance with embodiments, the internal heat transfer fins comprise one or more first internal heat transfer fins extending horizontally along the entire width of the heat transfer insert, and one or more second internal heat transfer fins extending vertically along the entire height of the heat transfer insert to define a grid with the first heat transfer fins.

In accordance with embodiments, the fuel cell assembly, the heat pipe for such a fuel cell assembly, and the fuel cell stack may have application in an electric powered vehicle, but other applications are contemplated herein.

Embodiments described herein provide a fuel cell assembly which thermally manages the fuel stack by providing temperature uniformity across the MEA. Such thermal management may occur, in accordance with embodiments, by enabling dry or air cooling of the stack, and thus, obviates the need of a liquid-based cooling system.

Embodiments described herein reduces the temperature gradient ($\Delta T$) across the MEA, by provided a heat pipe that includes a heat pipe separator plate having one or more heat transfer inserts exposed in upper interior voids at an air outlet region of the fuel cell assembly. The interior voids are spaced away from the peripheral surface or edges of the heat pipe separator plate. In that way, heat produced by the exothermic reaction of the MEA may be more rapidly removed from the center region of the heat pipe separator plate due to the shorter distance of travel of heat from the center region of the heat pipe separator plate. The overall heat transfer performance of the heat pipe, therefore, is enhanced.

Embodiments described herein permit, as the fuel cell stack generates heat, a portion of the air stream supplied to the cathode of the fuel cell is to flow through the upper interior manifold(s) to cool the stack from the interior, where the heat is concentrated.

Embodiments described herein provide a thermal management of a fuel cell stack with a heat pipe separator plate that has an effective thermal conductivity greater than 1000 W/m-K. Such thermal management enhances the temperature uniformity of the MEA by reducing the temperature gradient ($\Delta T$) across the MEA.

Embodiments described herein may also reduce overall costs in providing dry cooling or air cooling, thereby obviating the need for extra components, such as pumps, valves, fluid lines, radiators, fuel cell coolant, ion exchanger, etc.

Embodiments described herein provides a heat transfer insert, composed of a thermally conductive metal, and which comprises one or more internal heat transfer fins provided in one or more of the upper interior voids. Such an arrangement enhances the overall heat transfer performance of the heat pipe by drawing heat from the center region of the heat pipe and dissipating the heat into the interior manifold(s) or channel(s).

Embodiments described herein provides a heat pipe may further comprising an external heat transfer fin, located adjacent to the upper interior voids, to dissipate heat from the center region of the heat pipe through the exposed outer peripheral surface thereof.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIGS. 7A and 7B respectively illustrate a temperature profile of an MEA cooled via liquid cooling, and a temperature profile of an MEA cooled via a heat pipe separator in accordance with embodiments.

DETAILED DESCRIPTION

Figure 1:
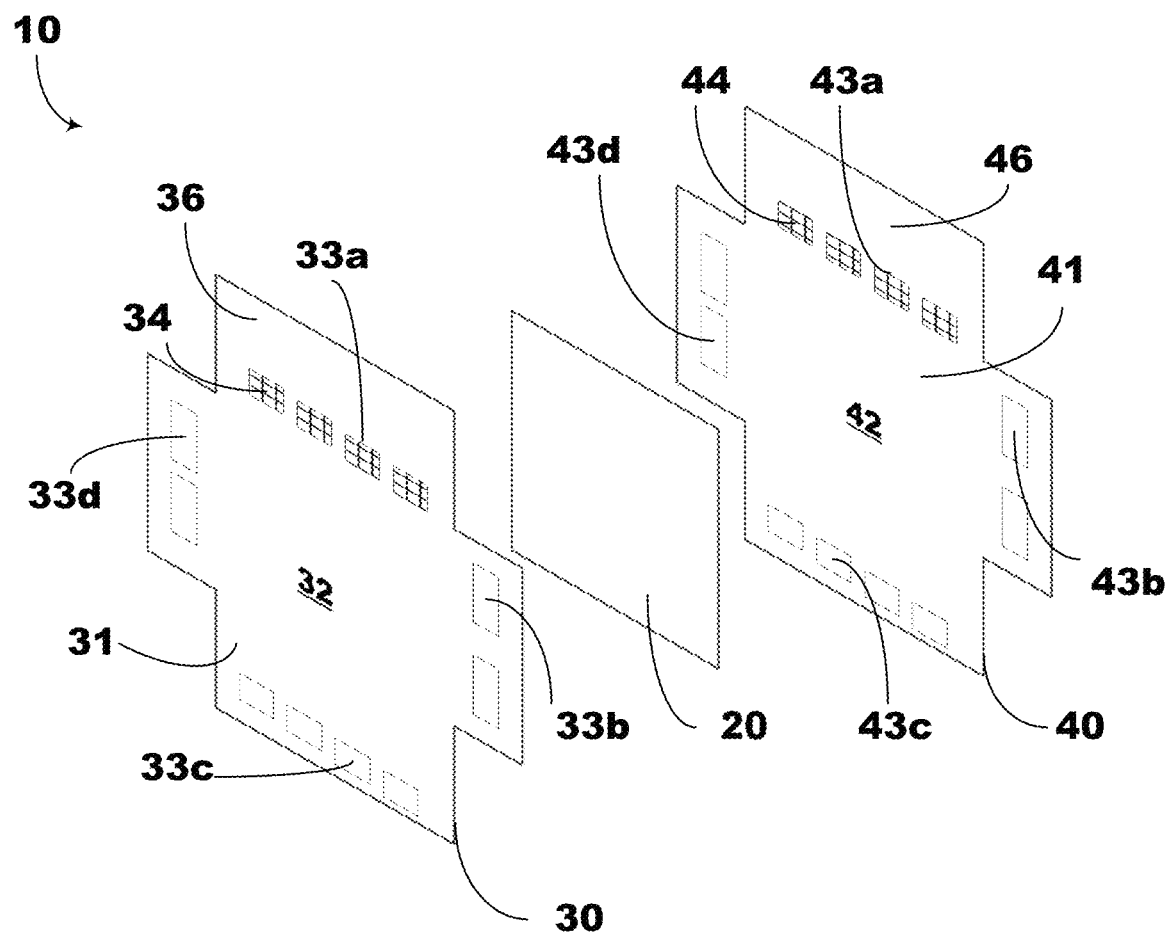
FIG. 1 is an exploded perspective view of a fuel cell assembly, in accordance with embodiments.
Figure 2:
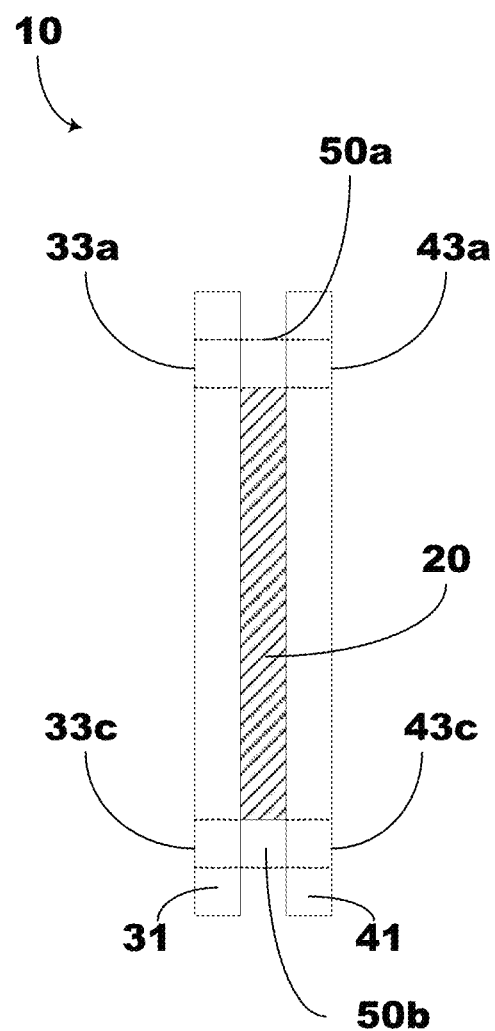
FIG. 2 is a side sectional view of a fuel cell assembly, in accordance with embodiments
Figure 3:
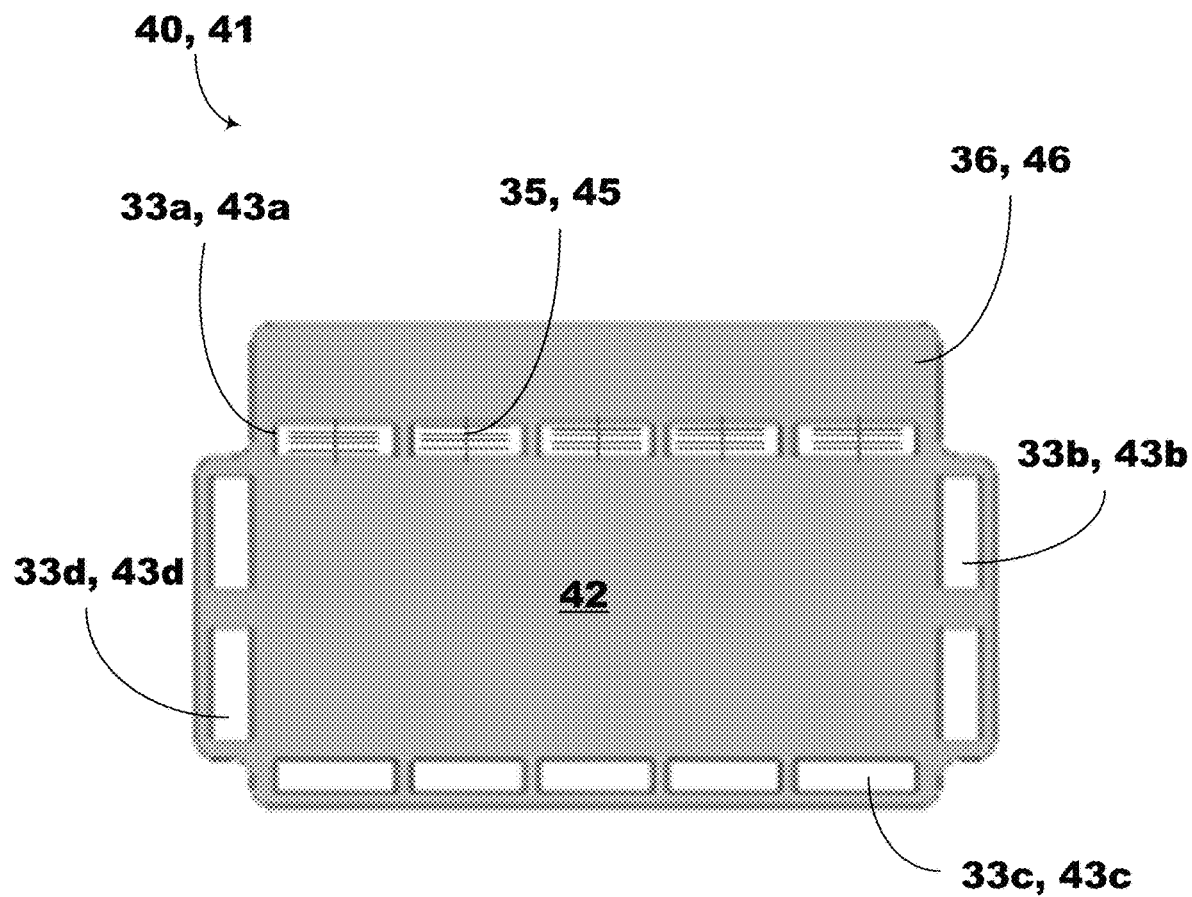
FIG. 3 illustrates a front view of a heat pipe, in accordance with embodiments.

As illustrated in FIGS. 1 and 2, a fuel cell assembly 10 may comprise a fuel cell 20 comprising an MEA, and a thermal management system for air cooling the fuel 20 using a portion of the air stream used to provide $O_2$ to the cathode as a second fuel reactant. The thermal management system comprises a first heat transfer device and a second heat transfer device respectively in thermal and physical contact with the MEA. The first heat transfer device includes a first heat pipe 30 on one side of the fuel cell 20, while the second heat transfer device includes a second heat pipe 40 on an opposite side of the fuel cell 20, thereby enclosing the front and rear planar sides of the fuel cell 20. Although the thermal management system in accordance with embodiments may be implemented for mobility applications such as for example, vehicles, embodiments are not limited thereto, and thus, may be implemented for stationary applications.

During operation of the fuel cell 20, $H_2$, as a first fuel reactant, is supplied to the anode, while $O_2$, as a second fuel reactant is supplied to the cathode via a stream of compressed air. A byproduct of such operation is heat. Because the overall performance of the fuel cell is sensitive to the temperature of the MEA, the heat pipes 30, 40 are to quickly and efficiently remove heat from the MEA in order to optimize the overall performance of the fuel cell assembly 10. In accordance with embodiments, this may be achieved by maintaining a uniform temperature across the MEA through the reduction of the temperature gradient ($\Delta T$) across the MEA. In particular, this may be achieved via dry cooling or air cooling of the fuel cell assembly 10 using a portion of the air stream supplied to the cathode (to provide $O_2$ as a fuel reactant) in order to quickly and efficiently remove heat from the MEA.

Figure 5:
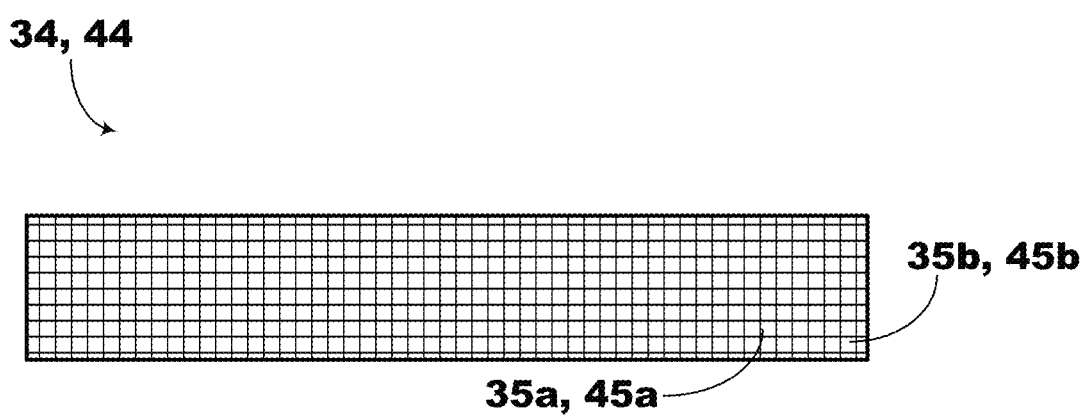
FIG. 5 is a front view of a heat transfer insert, in accordance with embodiments.

In accordance with embodiments, each heat pipe 30, 40 may comprise a heat pipe separator plate 31, 41 to physically and thermally contact an exposed planar surface of the fuel cell 20 when arranged in a stack 100 illustrated in FIG. 5. The heat pipe separator plate 31, 41 may comprise a central region 32, 42 defined by a plurality of interior cutouts or voids 33, 43 formed along the interior planar surface of the heat pipe separator plate 41. The central region 42 of the heat pipe separator plate 41 is to correspond substantially to the geographic shape, size and cross-section of unit fuel cell 20 for physical and thermal contact therewith when arranged in the stack. The heat pipe separator plate 31, 41 may be composed of a metal material or metal alloy material. In accordance with embodiments, the metal material may comprise titanium or copper, while the metal alloy material may comprise stainless steel. Embodiments, however, are not limited thereto, and thus, the heat pipe separator plate 31, 41 may be composed of other materials that fall within the spirit and scope of the principles of this disclosure set forth herein.

Figure 4:
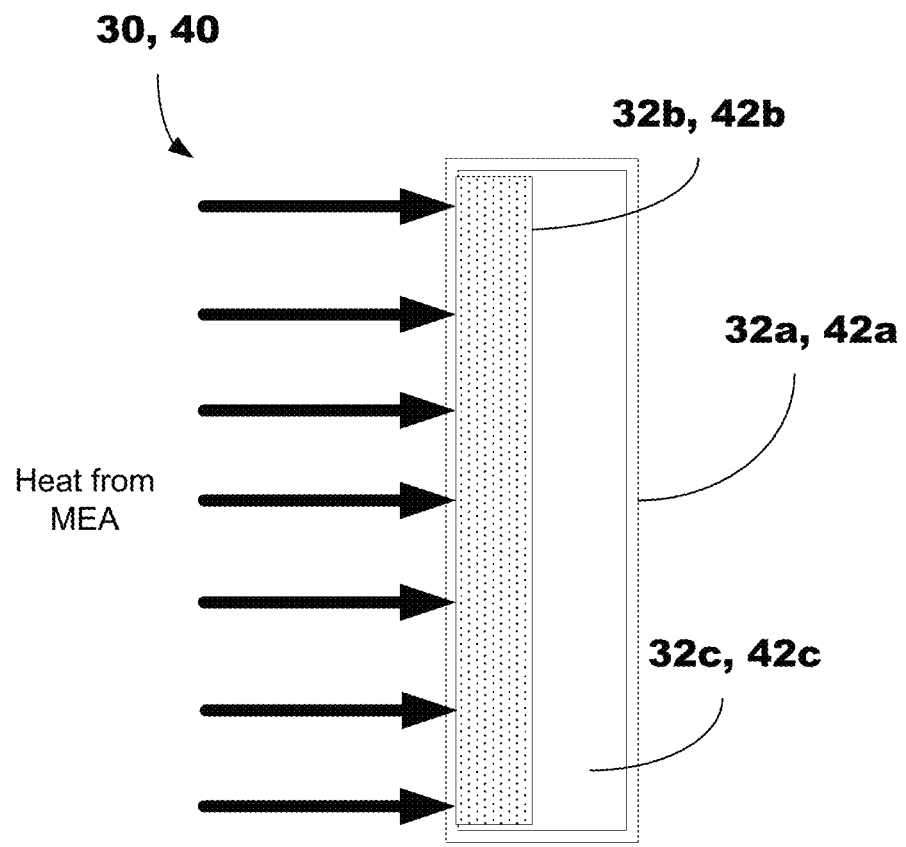
FIG. 4 illustrates a cross-sectional view of a central region of a heat pipe, in accordance with embodiments.

As illustrated in FIG. 4, in an embodiment, at least the central region 32, 42 may comprise an enclosed, vacuum-sealed structure comprising an outer surface 32a, 42a serving as a heat pipe envelope and an inner layer serving as a wick structure 32b, 42b. The wick structure 32b, 42b is to extend in a direction inwardly from the inner surface of the central region 32, 42 to thereby define the interior heat pipe chamber 32c, 42c, which is configured to receive and hold a working liquid for flow of the working fluid and vapor therethrough. The wick structure 32b, 42b may be of a type that falls within the spirit and scope of the principles of this disclosure set forth herein.

In accordance with embodiments, the heat pipe separator plate 31, 41 comprises heat transfer regions to enhance the overall transfer of heat therefrom in a manner which is to yield temperature uniformity across the fuel cell 20.

In accordance with embodiments, a first heat transfer region of the heat pipe separator plate 31, 41 is arranged immediately adjacent to the central region 32, 42, and comprises one or more upper interior voids 33a, 43a, arranged interior along the upper planar surface with respect to the outer periphery, and one or more lower interior voids 33c, 43c, arranged interior along the lower planar surface with respect to the outer periphery.

In accordance with embodiments, the upper interior voids 33a, 43a and the lower interior voids 33c, 43c are distributed along the width of the heat pipe separator plate 31, 41. The upper interior voids 33a, 43a and the lower interior voids 33c, 43c are spaced apart in a vertical direction along the planar surface the heat pipe separator plate 31, 41. Although the illustrated embodiment(s) illustrates the interior voids 33, 43 having a substantially rectangular cross-section, embodiments are not limited therewith, and thus, may encompass any other geometric structural configuration that falls within the spirit and scope of the principles of this disclosure set forth herein. The upper interior voids 33a of the heat pipe separator plate 31 and the upper interior voids 43a of the heat pipe separator plate 41 are to become coaligned when the fuel cell assembly 10 is arranged in a stack. This coalignment, in turn, is to define, one or more upper interior channels 50a through which a portion of the air stream supplied to the cathode may flow as a dissipater of heat. These upper interior channels 50a are to collectively form one or more upper interior manifolds 60a through which a portion of the air stream, supplied to a cathode side of the fuel cell 20 (to provide 02 as a fuel reactant), is to flow when the fuel cell assembly 10 is arranged in a stack with other fuel cell assemblies 10 in order to cool the fuel assembly 10.

In accordance with embodiments, a heat transfer insert 34, 44 is arranged in the upper interior voids 33a, 43a.

As illustrated in FIG. 5, in accordance with embodiments, the heat transfer insert 34, 44 comprises one or more internal heat transfer fins 35, 45 to enhance the overall heat transfer performance of the heat pipe 30, 40 by drawing heat from the central region 32, 42 and distributing the heat into the upper interior channels 50a. For instance, one or more internal heat transfer fins 35a, 45a may extend horizontally along the entire width of the heat transfer insert 34, 44 while one or more internal heat transfer fins 35b, 45b may extend vertically along the entire height of the heat transfer insert 34, 44 to define spaces forming a grid or matrix-like structure. With this arrangement, the overall heat transfer performance at the upper interior voids 33a, 43a is enhanced. Although the illustrated embodiment(s) includes internal heat transfer fins 35, 45 spatially arranged to form a grid or matrix-like structure, embodiments are not limited thereto, and thus, the internal heat transfer fins 35, 45 may be spatially arranged in any manner that falls within the spirit and scope of the principles of this disclosure set forth herein.

Although the illustrated embodment(s) illustrates the heat transfer inserts 34, 44 arranged to occupy each upper interior voids 33a, 43a, embodiments are not limited therewith, and thus, may encompass a structural design in which the heat transfer inserts 34, 44 may be arranged to occupy less than all the upper interior voids 33a, 43a. The heat transfer inserts 34, 44 and the internal heat transfer fins 35, 45 may be composed of a metal material exhibiting high thermal conductivity. As an example, the metal material may comprise copper or aluminum. Embodiments, however, are not limited thereto, and thus, the heat transfer inserts 34, 44 and the internal heat transfer fins 35, 45 may be composed of other materials that fall within the spirit and scope of the principles of this disclosure set forth herein.

A second heat transfer region of the heat pipe separator plate 31, 41 is arranged immediately adjacent to the first heat transfer region, and comprises an external heat transfer fin 46 adjacent to the upper interior voids 43a. The external heat transfer fin 46 is to facilitate the dissipation of a portion of the heat generated by the MEA through the exposed outer peripheral edges of the external heat transfer fin 46.

Figure 6:
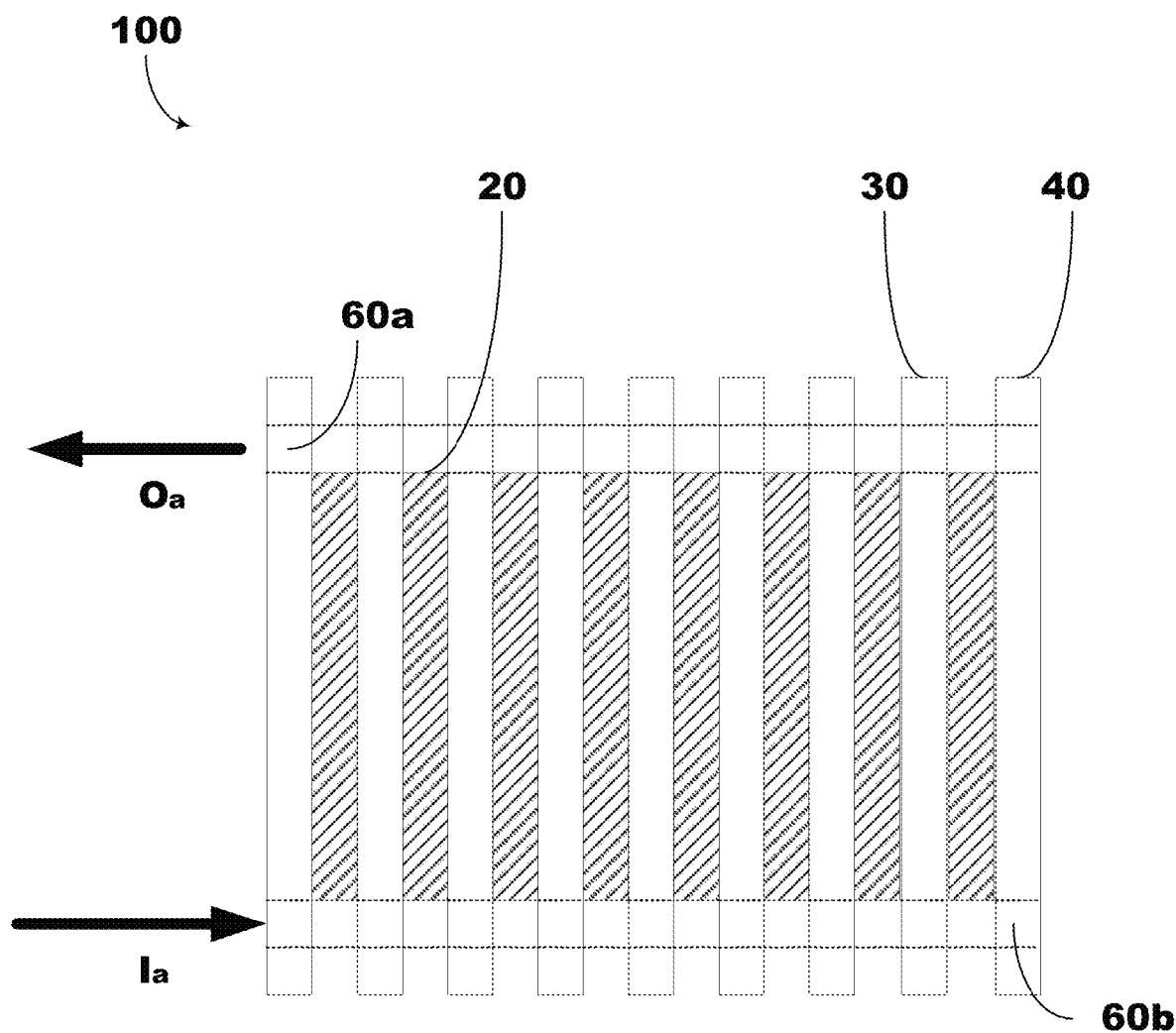
FIG. 6 illustrates a side sectional view of a fuel cell stack, in accordance with embodiments.

As illustrated in FIG. 6, a fuel cell stack 100 may comprise a plurality of fuel cell assemblies 10 described herein (e.g., upwards to hundreds of unit fuel cell assemblies 10 per stack).

The upper interior voids 33a of the heat pipe separator plate 31 and the upper interior voids 43a of the heat pipe separator plate 41 are to become coaligned when the fuel cell assembly 10 is arranged in a stack. This coalignment, in turn, is to define, one or more upper interior channels 50a through which a portion of the air stream supplied to the cathode may flow through the stack 100 for dissipating the heat from the fuel cell 20. These individual upper interior channels 50a, when each fuel cell assembly 10 is arranged in the stack 100, collectively form one or more upper interior manifolds 60a through which a portion of the air stream supplied to the cathode is to flow. In particular, the upper interior manifolds 60a forms an outlet $O_a$ through which the air stream exits the stack 100. By arranging the heat transfer inserts 34, 44, and the corresponding internal heat transfer fins 35, 45, in the upper interior channels 50a, the overall heat transfer performance of the heat pipes 30, 40 is enhanced by dissipating a portion of the heat generated by the MEA into the upper interior channels 50a, and thus, the upper interior manifolds 60a.

Likewise, the lower interior voids 33c of the heat pipe separator plate 31 and the lower interior voids 43c of the heat pipe separator plate 41 are to become coaligned when the fuel cell assembly 10 is arranged in a stack 100. This coalignment, in turn, is to define, one or more lower interior channels 50b through which a portion of the air stream supplied to the cathode may flow through the stack 100. These individual lower interior channels 50*b*, when each fuel cell assembly 10 is arranged in the stack 100, collectively form one or more lower interior manifolds 60*b* through which a portion of the air stream, supplied to a cathode side of the fuel cell (to supply $O_2$ as a fuel reactant), is to flow into the stack 100 and thereby cool the fuel assembly 10. In particular, the lower interior manifolds 60*b* forms an inlet $I_a$ through which a portion of the air stream supplied to the cathode enters the stack 100 and thereby cool the stack 100.

As illustrated in FIG. 7A, a temperature profile of an MEA cooled via liquid cooling is provided, while FIG. 7B illustrates a temperature profile of an MEA cooled via a heat pipe separator in accordance with embodiments. The heat source and the heat sink conditions are the same for the liquid cooling model and the heat pipe cooling model. Using heat pipe cooling, the fuel cell's membrane temperature is 70° C., with a temperature gradient ($\Delta T$) of 10° C. within the membrane. By comparison, when using liquid cooling, the membrane temperature is 89° C. with a temperature gradient ($\Delta T$) of 35° C.

Figure 8:
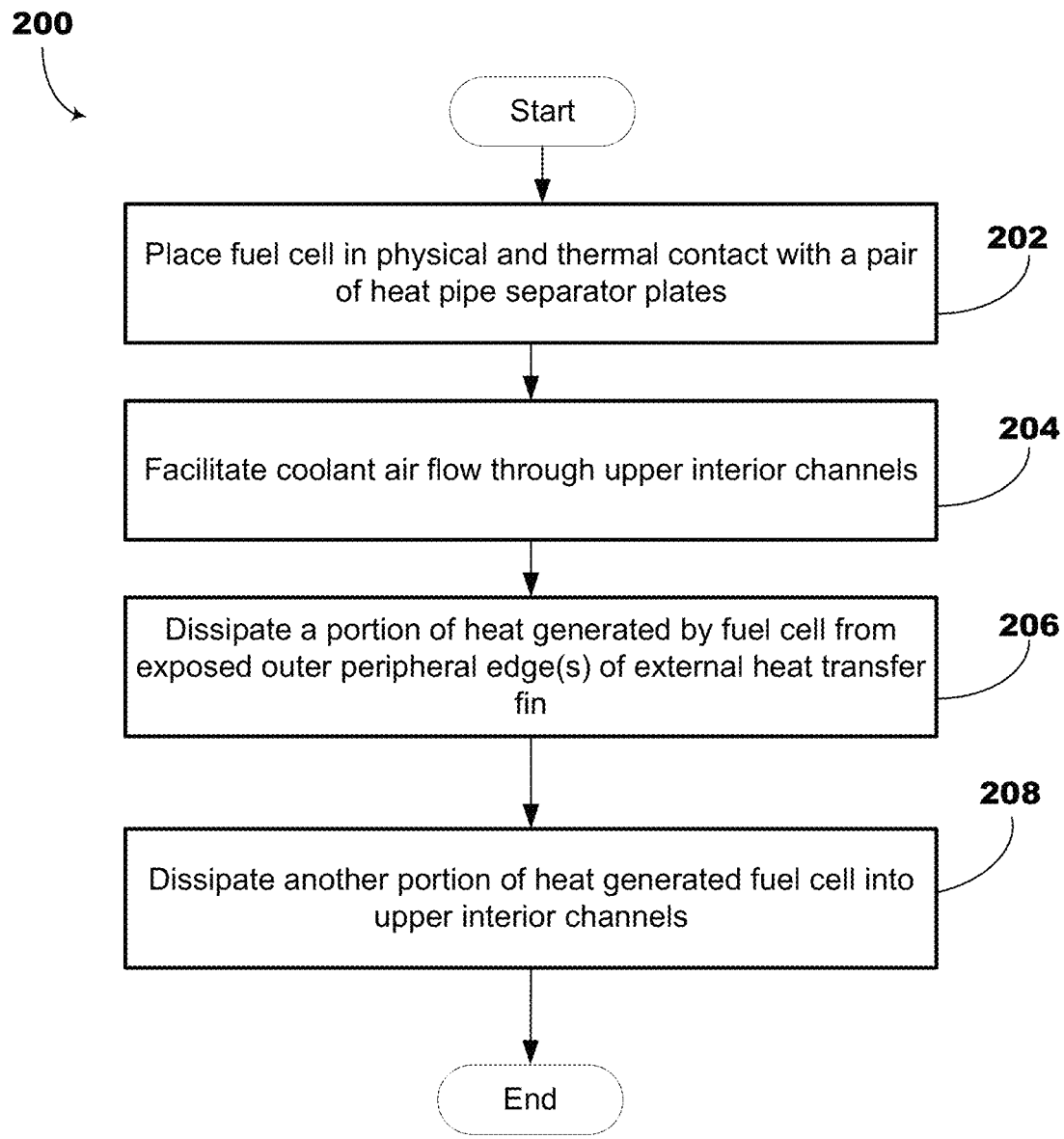
FIG. 8 is a flowchart of a method of cooling a fuel cell stack, in accordance with an embodiment.

As illustrated in FIG. 8, a method 200 for thermal management of a fuel cell is provided.

Block 202 includes placing a fuel cell in physical and thermal contact with a pair of heat pipe separator plates. In accordance with embodiments, each heat pipe separator plate respectively comprises an external heat transfer fin, one or more upper voids formed in an interior planar surface thereof, to be aligned with upper voids in a stack and thereby define one or more upper interior channels, and a heat transfer insert arranged in the upper voids, to include one or more internal heat transfer fins.

Block 204 includes, during operation of the fuel cell, facilitating a portion of the air stream supplied to the cathode to flow through the upper interior channels.

Block 206 includes dissipating, via the external heat transfer fin, a portion of heat generated by operation of the fuel cell from exposed outer peripheral edges of the external heat transfer fin.

Block 208 includes to dissipating, via the internal heat transfer fins, another portion of the heat generated by operation the fuel cell into the upper interior channels.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A fuel cell assembly, comprising:
a fuel cell, having a membrane electrode assembly (MEA) structure in which a cathode side thereof receives a stream of air to supply O2 as a fuel reactant; and
a first heat pipe including a first heat pipe separator plate in physical and thermal contact with a planar surface of the fuel cell, and a second heat pipe including a second heat pipe separator plate in physical and thermal contact with an opposite planar surface of the fuel cell, the first heat pipe separator plate and the second heat pipe separator plate including, respectively:
an external heat transfer fin to dissipate a portion of the heat generated by the fuel cell through exposed outer peripheral edges of the external heat transfer fin,
one or more upper voids, wherein the one or more upper voids of the first heat separator plate and the second heat separator plate are aligned when the fuel cell assembly is arranged in a stack, and the one or more upper voids define one or more upper interior channels in fluid communication with a portion of the air stream, and
a heat transfer insert, arranged in the one or more upper voids, to include one or more internal heat transfer fins to dissipate another portion of the heat generated by the fuel cell into the one or more upper interior channels for contact with the air stream.

2. The fuel cell assembly of claim 1, wherein the one or more upper voids are distributed along the width of the first heat pipe separator plate and the second heat pipe separator plate, respectively.

3. The fuel cell assembly of claim 1, wherein the first heat pipe separator plate and the second heat pipe separator plate further include, respectively, one or more lower voids, wherein the one or more lower voids of the first heat separator plate and the second heat separator plate are aligned when the fuel cell assembly is arranged in the stack, and the one or more lower voids define one or more lower interior channels through which the air stream is to flow into the fuel cell assembly.

4. The fuel cell assembly of claim 3, wherein the one or more upper voids are distributed along the width of the first heat pipe separator plate and the second heat pipe separator plate, respectively.

5. The fuel cell assembly of claim 3, wherein the one or more upper voids and the one or more lower voids are spaced apart from each other in a vertical direction relative to the planar surface.

6. The fuel cell assembly of claim 1, wherein the one or more internal heat transfer fins comprise one or more first internal heat transfer fins extending horizontally along the entire width of the heat transfer insert.

7. The fuel cell assembly of claim 6, wherein the one or more internal heat transfer fins comprise one or more second internal heat transfer fins extending vertically along the entire height of the heat transfer insert to define a grid with the one or more first internal heat transfer fins.

8. A heat pipe for a fuel cell assembly that includes a fuel cell having a membrane electrode assembly (MEA) structure in which a cathode side thereof receives a stream of air to supply O2 as a fuel reactant, the heat pipe comprising:
a heat pipe separator plate in physical and thermal contact with a planar surface of a corresponding fuel cell in the fuel cell assembly, the heat pipe separator plate including:
an external heat transfer fin to dissipate a portion of the heat generated by the fuel cell through exposed outer peripheral edges of the external heat transfer fin,
one or more upper voids, wherein the one or more upper voids are aligned with upper voids of an adjacent heat pipe separator plate when the fuel cell assembly is arranged in a stack, and the one or more upper voids define one or more upper interior channels in fluid communication with a portion of the air stream, and a heat transfer insert, arranged in the one or more upper voids, to include one or more internal heat transfer fins to dissipate another portion of the heat generated by the fuel cell into the one or more upper interior channels for contact with the air stream.

9. The heat pipe of claim 8, wherein the one or more upper voids and distributed along the width of the heat pipe separator plate.

10. The heat pipe of claim 8, wherein the heat pipe separator plate further includes one or more lower voids, wherein the one or more lower voids are aligned with one or more lower voids of the adjacent heat pipe separator plate when the fuel cell assembly is arranged in the stack, and the one or more lower voids define one or more lower interior channels through which the air stream is to flow into the fuel cell assembly.

11. The heat pipe of claim 10, wherein the one or more lower voids are distributed along the width of the heat pipe separator plate.

12. The heat pipe of claim 10, wherein the one or more upper voids and the one or more lower voids are spaced apart from each other in a vertical direction relative to the planar surface.

13. The heat pipe of claim 8, wherein the one or more internal heat transfer fins comprise one or more first internal heat transfer fins extending horizontally along the entire width of the heat transfer insert.

14. The heat pipe of claim 13, wherein the one or more internal heat transfer fins comprise one or more second internal heat transfer fins extending vertically along the entire height of the heat transfer insert to define a grid with the one or more first internal heat transfer fins.

15. A fuel cell stack, comprising:
a plurality of fuel cell assemblies, one or more of the fuel cell assemblies including a fuel cell a fuel cell having a membrane electrode assembly (MEA) structure in which a cathode side thereof receives a stream of air to supply O2 as a fuel reactant, a first heat pipe including a first heat pipe separator plate in physical and thermal contact with a planar surface of the fuel cell, and a second heat pipe including a second heat pipe separator plate in physical and thermal contact with an opposite planar surface of the fuel cell, the first heat pipe separator plate and the second heat pipe separator plate including, respectively:
an external heat transfer fin to dissipate a portion of the heat generated by the fuel cell through the exposed outer peripheral edges of the external heat transfer fin,
one or more upper voids, wherein the one or more upper voids of the first separator plate and the second separator plate are aligned when the fuel cell assembly is arranged in a stack, and the one or more upper voids define one or more upper interior channels in fluid communication with a portion of the air stream, and
a heat transfer insert, arranged in the one or more upper voids, to include one or more internal heat transfer fins to dissipate another portion of the heat generated by the fuel cell into the upper interior channels for contact with the air stream.

16. The fuel cell stack of claim 15, wherein the one or more upper voids and distributed along the width of the heat pipe separator plate.

17. The fuel cell stack of claim 15, wherein the heat pipe separator plate further includes one or more lower voids, wherein the one or more lower voids of the first heat separator plate and the second heat separator plate are aligned when the fuel cell assembly is arranged in the stack, and the one or more lower voids define one or more lower interior channels through which the air stream is to flow into the fuel cell assembly.

18. The fuel cell stack of claim 15, wherein the one or more lower voids are distributed along the width of the heat pipe separator plate.

19. The fuel cell stack of claim 15, wherein the one or more upper voids and the one or more lower voids are spaced apart from each other in a vertical direction relative to the planar surface.

20. The fuel cell stack of claim 15, wherein the one or more internal heat transfer fins comprise:
one or more first internal heat transfer fins extending horizontally along the entire width of the heat transfer insert, and
one or more second internal heat transfer fins extending vertically along the entire height of the heat transfer insert to define a grid with the one or more first internal heat transfer fins.

* * * * *